(12) United States Patent
Staschewski

(10) Patent No.: US 6,522,815 B1
(45) Date of Patent: Feb. 18, 2003

(54) METHOD OF PRODUCING AN OPTICAL CABLE WITH AN EXCESSIVE LENGTH OF THE OPTICAL WAVEGUIDES

(75) Inventor: Harry Staschewski, Langenhagen (DE)

(73) Assignee: Nexans Deutschland Industries AG & Co. KG, Monchengladbach (DE)

( * ) Notice: Subject to any disclaimer, the term of this patent is extended or adjusted under 35 U.S.C. 154(b) by 0 days.

(21) Appl. No.: 09/762,436
(22) PCT Filed: May 17, 2000
(86) PCT No.: PCT/EP00/05931
§ 371 (c)(1), (2), (4) Date: Apr. 5, 2001
(87) PCT Pub. No.: WO00/77552
PCT Pub. Date: Dec. 21, 2000

(30) Foreign Application Priority Data

Jun. 9, 1999 (DE) .................................. 199 26 267

(51) Int. Cl.$^7$ ................................................ G02B 6/44
(52) U.S. Cl. ..................................................... 385/109
(58) Field of Search ................................ 385/100, 101, 385/102, 103, 104, 105, 106, 107, 108, 109, 110, 147

(56) References Cited

U.S. PATENT DOCUMENTS 4,232,935 A * 11/1980 Rohner et al. ........... 350/96.23
5,857,255 A * 1/1999 Wichmann .................... 29/458
5,975,404 A * 11/1999 Ziemek et al. ............. 228/17.5

FOREIGN PATENT DOCUMENTS

| DE | 24 45 532 B1 | 1/1976 |
| DE | 25 19 680 A1 | 11/1976 |
| DE | 28 33 869 A1 | 2/1980 |
| DE | 27 43 260 C3 | 5/1990 |
| DE | 391 0 122 A1 | 10/1990 |
| DE | 40 03 311 A1 | 8/1991 |
| DE | 42 10 633 C2 | 4/1995 |
| DE | 44 34 133 A1 | 3/1996 |

* cited by examiner

Primary Examiner—Javaid Nasri
(74) Attorney, Agent, or Firm—Sughrue Mion, PLLC

(57) ABSTRACT

The invention relates to a method of producing an optical cable (1) or a modular unit for an optical cable. According to the inventive method, a metal strip that is drawn off a supply reel is gradually shaped to an open seam tube. At least one optical waveguide (2) is drawn off a second supply reel and introduced into the open seam tube. The longitudinal seam of the open seam tube is closed by welding and after welding an excessive length of the optical waveguide vis-á-vis the metal tube is produced in said metal tube. The welded metal tube (3) is crimped, dented or undulated (3b) to produce.

20 Claims, 2 Drawing Sheets

METHOD OF PRODUCING AN OPTICAL CABLE WITH AN EXCESSIVE LENGTH OF THE OPTICAL WAVEGUIDES

BACKGROUND OF THE INVENTION

The invention relates to a process for producing a fiber optic cable, or an assembly element for a fiber optic cable.

A process for adjusting the excess length of a fiber optic cable, which contains at least one optical fiber, in relation to a sheath in the form of a metal tube is disclosed in DE 39 10 122. The metal tube is drawn through a bending apparatus for plastic deformation and is subsequently straightened again. The idea underlying this publication is that the limit of longitudinal elastic deformation is substantially higher under tensile load than under compressive load. Thus, in the outer curvature area, the metal tube is deformed only elastically, but in the interior also plastically with the result that the straightened metal tube is shortened. The excess length that can be achieved with this process is limited to less than 0.3%.

DE 40 03 311 discloses a process for producing the excess length in which the strip to be formed into the tube, or a certain tube segment, is reversibly elongated and the optical fibers are inserted into the tube thus being formed in the region of the elongated tube segment. The metal strip or tube segment is heated to above the ambient temperature and finally cooled, which causes the tube to become shorter. This process, too, does not permit excess lengths of more than 0.3% since too much heat would damage the optical fibers.

DE 42 10 633 discloses a process for producing excess length in which the metal tube containing the optical fibers is upset and thus plastically shortened, so that the optical fibers lie in the upset metal tube with a defined excess length. Although this process permits excess lengths of between 1% and 8%, the cost involved is substantial, so that it is practically excluded for cost-effective production.

Finally, DE 44 34 133 discloses a process for producing a fiber optic cable in which the excess length of the optical fibers is produced by placing the metal tube around a capstan in at least one turn. The force applied by the capstan to the metal tube causes an elastic deformation of up to 0.6%. The elastic elongation of the metal tube is cancelled out on the capstan.

SUMMARY OF THE INVENTION

The object of the invention is to provide a process for producing a metal tube containing one or more optical fibers making it possible to obtain almost any adjustable excess length of the optical fibers relative to the metal tube.

This object is obtained by a process and device according to the present invention, the features of which are set forth in more detail below.

Advantageous further embodiments of the invention are set forth in the dependent claims.

BRIEF DESCRIPTION OF THE DRAWINGS

The invention will now be described in greater detail with the help of schematically depicted examples with reference to FIGS. 1 to 3.

The advantages, nature and various additional features of the invention will appear more fully upon consideration of the illustrative embodiment of the invention which is schematically set forth in the drawings, in which.

DETAILED DESCRIPTION OF THE INVENTION

Figure 1:
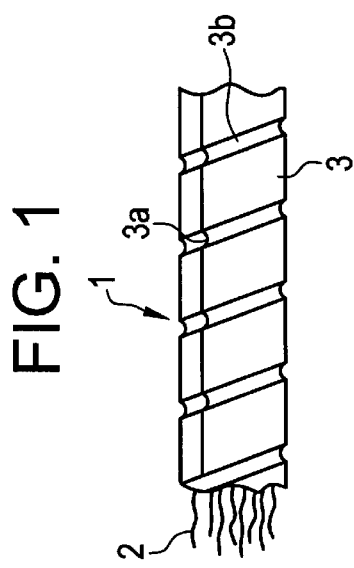
FIG. 1—is a diagrammatical representation of a segment of fiber optic cable made in accordance with the present invention.
Figure 4:
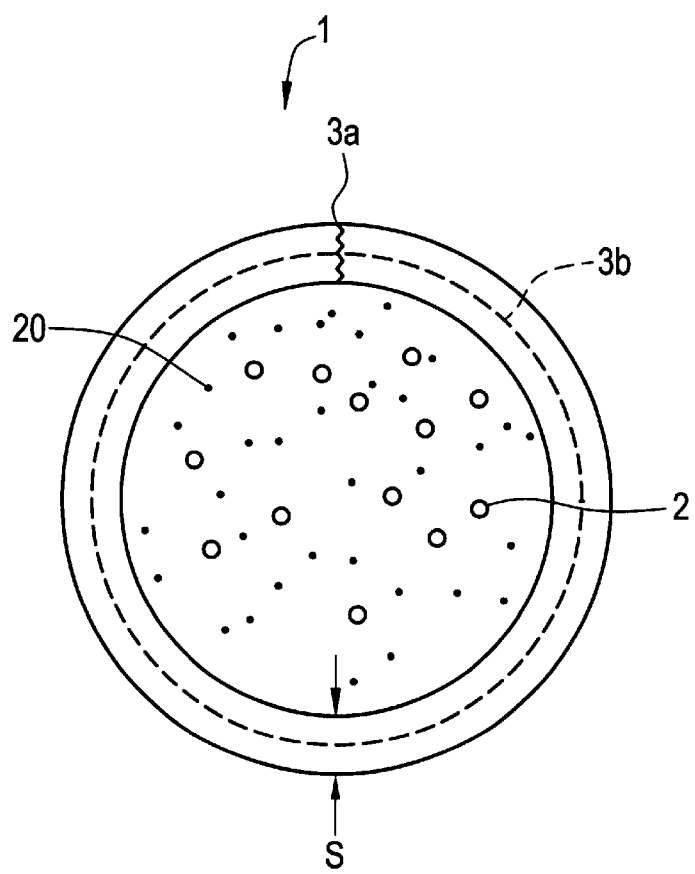
FIG. 4—is a diagrammatical representation of a cross-section of the fiber optic cable depicted in FIG. 1.

FIG. 1 is a perspective view of a segment of a fiber optic cable produced according to the teaching of the invention. The fiber optic cable I comprises the optical fibers 2 and the metal tube 3, which surrounds said optical fibers 2 and is provided with a longitudinal weld seam 3a. The clearance between the optical fibers 2 and the metal tube 3 can be filled with petroleum jelly 20 to prevent longitudinal water migration. (See FIG. 4). The number of optical fibers 2 is typically between 6 and 20, but can be as high as 144. The metal tube 3 has a helical corrugation 3b by means of which metal tube 3 is shortened compared to the smooth tube. As a result, the optical fibers 2 have a greater length than the metal tube 3 and thus extend in undulating, helical or sinusoidal manner within metal tube 3. The excess length can be up to 5%, but is preferably between 0.5% and 1%. The wall thickness S of the metal tube is, for instance, 1 mm, whereas its outside diameter is 6 mm. The preferred material for the metal tube 3 is aluminum.

Figure 2:
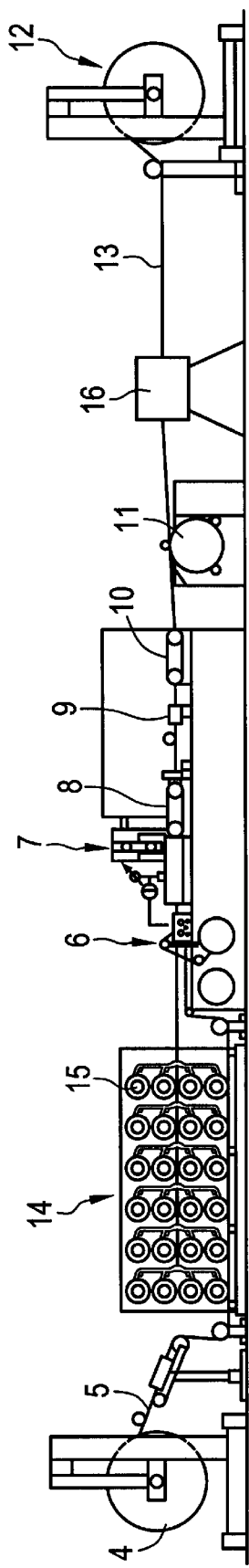
FIG. 2—is a diagrammatical representation of an apparatus for carrying out the process of the present invention.

FIG. 2 shows a side elevation of an apparatus for carrying out the process according to the invention.

From a storage coil 4, a strip 5 is continuously withdrawn and supplied to a forming apparatus 6 in which strip 5 is formed into a tube with a longitudinal slit. An edge trimming device (not depicted) in which strip 5 is cut exactly to the required width forms part of this forming apparatus 6. The forming apparatus 6 further comprises several sets of shaping rollers (not depicted). The longitudinal slit of the shaped tube is sealed by means of a laser welding unit 7. Precise guidance of the slit tube under the welding unit 7 is ensured by a first grip jaw puller 8 comprising a plurality of grip jaw pairs, which encircle the tube and are driven via an endless chain. Downstream from the first grip jaw puller 8 is a tube reducing device 9, e.g. a drawing die, in which the diameter of the tube is reduced. A second grip jaw puller 10, which is arranged downstream from the pipe reducing device 9, engages with the drawn tube and pulls it through the drawing die. The pull rate of the second grip jaw puller 10 relative to the pull rate of the first grip jaw puller 8 is controlled as a function of the sag of the tube between the drawing die and the first grip jaw puller 8. Downstream from the second grip jaw puller 10 is a driven capstan 11 against the circumferential surface of which the tube is supported in several turns. The capstan 11 is driven at a pull rate equal to the pull rate of the second grip jaw puller 10.

14 identifies a processing device for a plurality of optical fibers 2, which is equipped with a plurality of coils 15 onto which the optical fibers 2 are wound.

The optical fibers 2 are pulled off the coils 15 and are inserted into the still open tube upstream from the welding device. To protect the delicate optical fibers 2, a stationary metal tube (not depicted) protrudes into the slit tube through the interior of which the optical fibers 2 are guided. The metal tube releases the optical fibers 2 no earlier than downstream from the welding device 7. Said metal tube is surrounded by a further metal tube in a concentric arrangement. Through the annular gap formed by the two concentric metal tubes, petroleum jelly is filled into the tube under pressure.

In the tube segment that is wound onto capstan 11, the length of the optical fibers 2 is equal to the length of the metal tube 3.

To produce the excess length of the optical fibers 2 compared to the metal tube 3, a corrugation device 16 is arranged downstream from the capstan 11 which presses a corrugation into the wall of the tube in a continuous operation. The excess length of the optical fiber 2 is a function of the depth and the pitch of the corrugation.

Instead of the corrugation device 16, a creasing device may be provided that forms several creases in the tube wall, which in turn form a continuous crease in circumferential direction. The excess length in this case is a function of the depth and the shape of the crease as well as the spacing between creases. With the process according to the invention the excess length can be adjusted precisely.

To prevent torsion of the metal tube by the circumferential corrugator of the corrugation device, a further grip jaw puller (not depicted) may be provided upstream from the corrugation device. The speed of the corrugation device 16 or the creasing device can be controlled by dancer rolls arranged upstream and/or downstream from the corrugation device 16.

The finished metal tube 13, which encloses the optical fibers 2, is finally wound onto a take-up drum 12.

In the embodiment shown, the metal tube is corrugated and creased in the same operation as the tube is produced.

It is also possible, however, first to produce a smooth tube without corrugation, and to wind this tube onto the take-up drum 12. The optical fibers 2 and the metal tube at this point have the same length. In a subsequent operation, the corrugation or creasing can then be formed in the tube wall to produce the excess length of the optical fibers 2.

Figure 3:
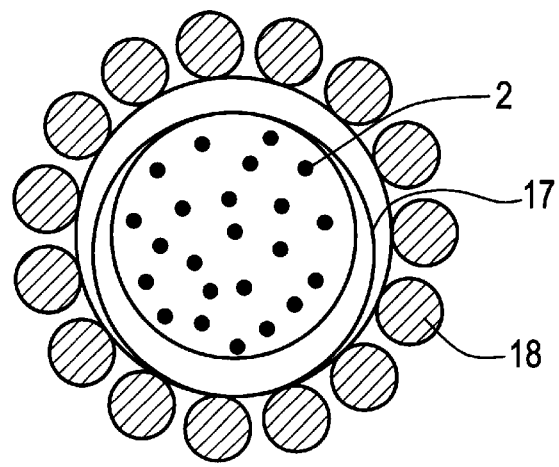
FIG. 3—is a diagrammatical representation of an alternative embodiment of a fiber optic cable made in accordance with the present invention.

FIG. 3 shows a particularly advantageous embodiment of an optical element produced in accordance with the teaching of the invention.

This figure shows an optical ground wire cable that can be produced particularly cost-effectively. A slightly corrugated aluminum tube 17 in which up to 144 optical fibers 2 with an excess length of at least 0.5% are present is arranged in the center of the optical ground wire cable. A layer of externally aluminum-coated steel wires 18 is placed onto the central aluminum tube 17. Due to the corrugation or creasing of the aluminum tube 17, its rigidity against transverse compression is higher than that of a smooth aluminum tube. The teaching of the invention thus makes it possible to use a smaller wall thickness to meet a certain required rigidity against transverse compression for an aluminum tube. As an example of a corrugated aluminum tube, the following dimensions are cited:

Outside diameter: 6.0 mm
Corrugation depth: 0.1 mm
Pitch: 3.4 mm
Wall thickness: 0.8 mm

What is claimed is:

1. A process for manufacturing optic cable or a structural element for an optic cable, in which a metal strip pulled off from a supply coil is gradually shaped into an open-seam tube, at least one optical waveguide pulled off from another supply coil is inserted into the still open open-seam tube, a longitudinal slit of the open-seam tube is welded shut and after welding, an excess length of the optical waveguide compared to the metal tube is produced in the metal tube, characterized in that the welded metal tube is placed with at least one winding around a cylindrical disk and then creased, indented or corrugated.

2. Process according to claim 1, characterized in that the metal tube is provided with self-contained creases, indentations, or corrugations forming a ring.

3. Process according to claim 1, characterized in that the metal tube is provided with a crease, indentation, or corrugation running annularly or spirally.

4. Process according to claim 1, characterized in that a predefinable excess length of the optical waveguide is produced by the depth and/or the distance between the creases, indentations or corrugations.

5. Process according to claim 1, characterized in that the excess length is produced in a separate work procedure after the welding.

6. Process according to claim 1, characterized in that a gel-like filler is inserted into the still open open-seam tube.

7. Process according to claim 1, characterized in that an aluminum tube is produced with an outer diameter to wall thickness ratio from 5 to 10.

8. Application of the process according to claim 1, for production of a structural element for an overhead optic cable with a centrally arranged metal tube with optic waveguides and metal wires twined onto the metal tube.

9. The process according to claim 1, wherein said welded metal tube is creased, indented or corrugated on an outer surface of said tube.

10. A process for manufacturing optic cable or a structural element for an optic cable, comprising:

pulling a metal strip off from a supply coil;
shaping said metal strip into an open-seam tube having a longitudinal slit;
inserting at least one optical waveguide into said open-seam tube;
welding said longitudinal slit to create a welded metal tube;
winding said welded metal tube onto a cylindrical disk; and
indenting, creasing or corrugating said welded metal tube after said winding step such that said welded metal tube is reduced in length by 0.5 to 5%.

11. A process for manufacturing optic cable or a structural element for an optic cable, comprising:

pulling a metal strip off from a supply coil;
shaping said metal strip into an open-seam tube having a longitudinal slit;
inserting at least one optical waveguide into said open-seam tube;
welding said longitudinal slit to create a welded metal tube;
winding said welded metal tube onto a cylindrical disk; and
indenting, creasing or corrugating said welded metal tube after said winding step to reduce the length of said welded metal tube.

12. The process claimed in claim 11, wherein said reduction in length is between 0.5 and 5%.

13. The process claimed in claim 11, wherein said reduction in length is between 0.5 and 1%.

14. The process claimed in claim 11, wherein said indentation, creasing, or corrugation is made on an outer surface of said welded metal tube.

15. The process claimed in claim 11, wherein said indentations, creases, or corrugations form rings on said welded metal tube.

16. The process claimed in claim 11, wherein said indentation, crease or corrugation runs annularly or spirally along a length of said welded metal tube.

17. The process claimed in claim 11, wherein a predefinable excess length of the optical waveguide is produced by the depth and/or the distance between the indentations, creases or corrugations.

18. The process claimed in claim 11, wherein a gel-like filler is inserted into said open-seam tube prior to said welding step.

19. The process claimed in claim 11, wherein said welded metal tube is produced with an outer diameter to wall thickness ratio from 5 to 10.

20. An application of the process according to claim 11, for production of a structural element for an optic cable with a centrally arranged metal tube with optic waveguides and metal wires twined onto said welded metal tube.

* * * * *